US011142607B2

(12) United States Patent
Jaunky et al.

(10) Patent No.: US 11,142,607 B2
(45) Date of Patent: Oct. 12, 2021

(54) POLYMER HAVING POLYETHER AND POLYSILOXANE SEGMENTS

(71) Applicant: BYK-Chemie GmbH, Wesel (DE)

(72) Inventors: Guillaume Wojciech Jaunky, Wesel (DE); Marc Eberhardt, Wesel (DE); Mark Heekeren, Wesel (DE); Sven Tenbusch, Wesel (DE); Olaf Muschiolik, Wesel (DE); Jürgen Hartmann, Wesel (DE); Petra Della Valentina, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 16/632,937

(22) PCT Filed: Jul. 23, 2018

(86) PCT No.: PCT/EP2018/069863
§ 371 (c)(1),
(2) Date: Jan. 22, 2020

(87) PCT Pub. No.: WO2019/020542
PCT Pub. Date: Jan. 31, 2019

(65) Prior Publication Data
US 2020/0283558 A1    Sep. 10, 2020

(30) Foreign Application Priority Data

Jul. 26, 2017 (EP) ..................... 17183315

(51) Int. Cl.
| | | |
|---|---|---|
| *C08G 77/46* | (2006.01) | |
| *C08F 290/06* | (2006.01) | |
| *B05D 7/14* | (2006.01) | |
| *B05D 7/00* | (2006.01) | |
| *C08G 65/08* | (2006.01) | |

(52) U.S. Cl.
CPC ............ *C08F 290/062* (2013.01); *B05D 7/14* (2013.01); *B05D 7/52* (2013.01); *C08F 290/068* (2013.01); *C08G 65/08* (2013.01); *C08G 77/46* (2013.01)

(58) Field of Classification Search
None
See application file for complete search history.

(56) References Cited

U.S. PATENT DOCUMENTS

| | | | | |
|---|---|---|---|---|
| 4,508,884 A | * | 4/1985 | Wittmann | ............ C08F 230/08 351/159.33 |
| 6,060,530 A | * | 5/2000 | Chaouk | ................ B01D 67/003 521/64 |
| 7,122,599 B2 | | 10/2006 | Haubennestel et al. | |
| 8,686,099 B2 | * | 4/2014 | Guyer | ...................... G02C 7/04 526/279 |
| 8,952,118 B2 | | 2/2015 | Arkles et al. | |
| 9,115,242 B2 | | 8/2015 | Jaunky et al. | |
| 10,676,575 B2 | * | 6/2020 | Zhang | ................... C08F 290/12 |
| 2008/0227871 A1 | | 9/2008 | Kim et al. | |
| 2008/0273168 A1 | * | 11/2008 | Rathore | ................. A61P 27/02 351/159.33 |
| 2009/0299022 A1 | * | 12/2009 | Ichinohe | ................ G02B 1/043 526/279 |
| 2013/0040207 A1 | * | 2/2013 | Gupta | ................... C08F 230/08 429/311 |
| 2015/0011788 A1 | * | 1/2015 | Saxena | ...................... C07F 7/21 556/437 |

FOREIGN PATENT DOCUMENTS

| | | |
|---|---|---|
| EP | 1985645 B1 | 3/2017 |
| JP | 2001026721 A | 1/2001 |
| JP | 2001098040 A | 4/2001 |
| JP | 2001139644 A | 5/2001 |
| JP | 2002285019 A | 10/2002 |
| JP | 2018531997 A | 11/2018 |
| WO | 2009086079 A1 | 7/2009 |
| WO | 2017036612 A1 | 3/2017 |

OTHER PUBLICATIONS

International Search Report and Written Opinion for International Application No. PCT/EP2018/069863 dated Sep. 19, 2018.

* cited by examiner

*Primary Examiner* — Robert S Loewe
(74) *Attorney, Agent, or Firm* — Fitch, Even, Tabin & Flannery LLP

(57) ABSTRACT

The invention relates to a polymer having a) a polymer backbone and b) one or more polymeric side chains covalently linked to the polymer backbone, wherein the polymeric side chains comprise a polyether segment and a polysiloxane segment, said polysiloxane segment having a number average molecular weight in the range of 1050 to 6000, and said polyether segment being positioned between the polymer backbone and the polysiloxane segment.

18 Claims, No Drawings

POLYMER HAVING POLYETHER AND POLYSILOXANE SEGMENTS

The invention relates to a polymer having polyether and polysiloxane segments linked to a polymer backbone and processes for preparing the polymer. The invention further relates to a composition comprising the polymer and to the use of the polymer.

Polymers of the above-mentioned type are described in WO 2017/036612. This document relates to a (meth)acrylic copolymer having polyether-polysiloxane side chains attached to the (meth)acrylic polymer backbone. The polysiloxane portion of the side chains has a number average molecular weight below 1,000. The polymers described in this document can be used as additive in coating compositions to modify the surface properties of coatings prepared from the compositions.

U.S. Pat. No. 7,122,599 describes a polymeric coating or molding composition having anti-adhesion and dirt repellency properties comprising a branched polymer comprising a polymeric base molecule having polydiorganosiloxane side chains with a weight average molecular weight between 1,000 and 30,000.

There is a need for improved additives to control surface properties of compositions. More in particular, there is a delicate balance between desired surface properties like slip, levelling, dirt repellency, anti self-cleaning properties on the one hand, and undesired surface properties, like insufficient over-coating properties and surface imperfections, on the other hand. In many cases, additives providing one or more of the desired surface properties cause undesired surface properties as well. The invention seeks to provide a polymer suitable as additive having an improved balance of causing desired and undesired surface properties. Furthermore, the polymer suitable as additive should not deteriorate other properties, such as mechanical properties, weathering resistance and corrosion protection. The polymer should preferably be effective in controlling surface properties when added to compositions in small amounts.

The invention provides a polymer having
a) a polymer backbone and
b) one or more polymeric side chains covalently linked to the polymer backbone, wherein the polymeric side chains comprise a polyether segment and a polysiloxane segment, said polysiloxane segment having a number average molecular weight in the range of 1050 to 6000, and said polyether segment being positioned between the polymer backbone and the polysiloxane segment.

The polymer according to the invention is suitable as additive having an improved balance of causing desired and undesired surface properties. Furthermore, the polymer suitable as additive does not deteriorate other properties, such as mechanical properties, weathering resistance and corrosion protection. Furthermore, the polymer is effective in controlling surface properties when added to compositions in small amounts.

The polymer of the invention has a polymer backbone. The polymer backbone is a linear or branched polymer having repeating units. Preferably, the polymer backbone is a substantially or entirely linear structure. Generally, the type of polymer which forms the polymer backbone is not particularly limited and can be chosen from the polymer types known to the skilled person. Examples of suitable polymer types include polyesters, polyurethanes, polycarbonates, and polymers and copolymers of polymerizable ethylenically unsaturated monomers. In view of the wide variety of available ethylenically unsaturated monomers having further functional groups, polymers and copolymers, collectively referred to as (co)polymers, of such monomers are preferred as polymer backbone. Examples of suitable ethylenically unsaturated monomers are vinylesters, vinylethers, vinylaromatic compounds, such as styrene, acrylic and methacrylic acid as well as esters and amides thereof, collectively referred to as (meth)acrylates. In preferred embodiments, the polymer backbone comprises at least 50% more preferred at least 75% by weight, of polymerized units of (meth)acrylates.

The polymer of the invention generally has a weight average molecular weight in the range of from 2,000 to 200,000, preferably of from 2,500 to 150,000, more preferably of from 3,000 to 100,000, even more preferably of from 3,500 to 75,000, still more preferably of from 4,000 to 50,000, yet more preferably of from 4,250 to 25,000, in particular of from 4,500 to 15,000, most preferably of from 5,000 to 10,000. The weight average molecular weight of the inventive polymers can be determined via GPC using polystyrene standards and tetrahydrofuran (with 1 volume-% of dibutylamine) as eluent.

One or more polymeric side chains are covalently linked to the polymer backbone. Typically, two or more polymeric side chains are covalently linked to the polymer backbone. Such a polymer structure with multiple polymeric side chains linked to a polymer backbone is also referred to as comb polymer. The polymeric side chains comprise a polyether segment and a polysiloxane segment. The polyether segment is located between the polymeric backbone and polysiloxane segment. In one embodiment, the polymeric side chains consist essentially of a polyether segment and a polysiloxane segment. In other embodiments, the polymeric side chains may have further segments. Examples of further segments include polyether segments and polyester segments. In one embodiment, the individual polymeric side chains have the same type of segments. In other embodiments, polymeric side chains with different types of segments may be present.

The polysiloxene segment of the polymeric side chains has a number average molecular weight in the range of 1050 to 6000, preferably 1100 to 6000, and more preferably 1200 to 5000. The number average molecular weight range of the polysiloxane segment is believed to cause an improved balance of desired and undesired surface properties.

The number average molecular weight of the polysiloxane segment of the one or more Polymeric side chains is determined according to the method described hereinafter ("Test methods"), i.e. is determined via GPC using polydimethylsiloxane standards and toluene as eluent. Said number average molecular weight corresponds to the number average molecular weight of a mono-Si—H-functional polysiloxane minus 1 (i.e. minus the weight of a hydrogen atom). Said mono-Si—H-functional polysiloxane can be used as starting material for preparing side chain or side chain unit of the inventive copolymer before the polysiloxane is bound to the polyether of the side chain to be formed. During said reaction, the mono-Si—H-functional polysiloxane formally "loses" a hydrogen atom.

The polysiloxane segments of the polymeric side chains are suitably based on mono Si—H functional polysiloxane building blocks having the required number average molecular weight as defined above. Such polysiloxane building blocks can be represented by formula (I):

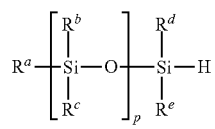

wherein parameter p is in the range of from 10 to 80, preferably in the range of from 11 to 80, more preferably in the range of from 12 to 66.

$R^a$, $R^b$, $R^e$, $R^d$ and $R^e$ independently of one another represent a linear, saturated, halogenated or non-halogenated alkyl group with 1 to 30 carbon atoms, more preferably with 1 to 20 carbon atoms, even more preferably with 1 to 10 carbon atoms, still more preferably, with 1 to 8 carbon atoms, in particular with 1 to 4 carbon atoms, most preferably with 1 to 21 carbon atoms or with carbon atom only, a branched, saturated, halogenated or non-halogenated alkyl group with 3 to 30 carbon atoms, more preferably with 3 to 20 carbon atoms, even more preferably with 3 to 10 carbon atoms, still more preferably, with 3 to 6 carbon atoms, an aryl group with 6 to 30 carbon atoms, preferably with 6 to 15 carbon atoms, an alkylaryl group or arylalkyl group, in each case with 7 to 30 carbon atoms, preferably with 7 to 20 carbon atoms, or an alkoxyalkyleneoxide residue or an alkoxypolyalkyleneoxide residue, wherein the alkylene unit is in each case preferably a C2-C4, more preferably an C2- and/or C3-alkylene unit, such as e.g. —(CH2)3-0-[(CH2)2-3-Q]$_r$-CH3, wherein r is 1 to 10.

Of course, the polysiloxane segment of the one or more side chains to be incorporated into the inventive polymer, which polysiloxane portion is obtainable from a compound of formula (1), must have in total a number average molecular weight in the range of from 1,050 to 6,000.

Compounds of formula (I) can be prepared by well-known methods. For example, such mono-Si—H functional polydialkylsiloxanes can be produced by a living polymerization of cyclic siloxanes, such as hexamethylene cyclotrisiloxane. The termination can be e.g. achieved by use of a silane. Such method is e.g. disclosed by Suzuki in Polymer, 30 (1989) 333, in WO 2009/086079 A2, EP 1 985 645 A2 and US 2013/0041098 A 1.

Scheme 1

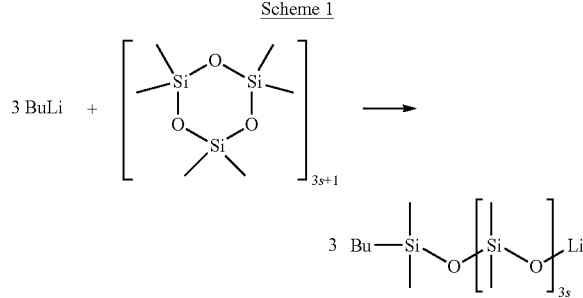

The functionalization of the end group, i.e. formation of the single Si—H-bond can then be performed by reaction with e.g. chlorosilanes, such as dimethylchlorosilane as illustrated below in Scheme 2:

Scheme 2.

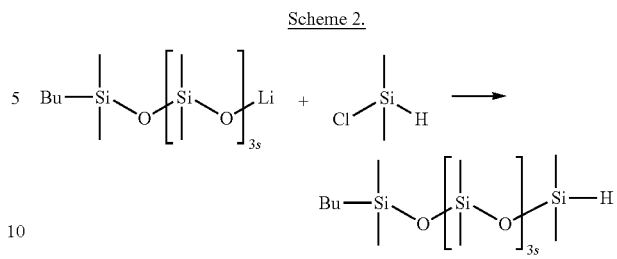

The polyether segment located between the polymeric backbone and the polysiloxane segment generally has a number average molecular weight in the range of 300 to 10,000. In a preferred embodiment, preferably 400 to 8000, more preferably 450 to 5000. The number average molecular weight of polyether segments can be determined using GPC.

The polyether segment generally comprises polymerized units of alkylene oxides. The alkylene oxides are preferably selected from ethylene oxide, propylene oxide, and combinations thereof. It is particularly preferred, that the polyether segments comprises or consist of polymerized units of ethylene oxide. If the polyether segment comprises polymerized units of more than one type of alkylene oxide, such units can be arranged statisitically, as a gradient, or in blocks. The number of polymerized alkylene oxide units in the polyether segment generally in s in the range of 3 to 100, such as 3 to 50, or 5 to 50.

In some embodiments, the polymer of the invention carries functional groups, in particular functional groups, which are capable of participating in curing reactions of composition to which the polymer of the invention is added to improve surface properties. The type of functional groups is not particularly limited and may be selected to match functional groups which may be present in a composition to which the polymer is added. Examples of functional groups include hydroxyl groups, carboxylic acid groups, amino groups, etherified amino groups, amide groups, epoxide groups, alkoxysilyl groups, ethylenically unsaturated polymerizable groups, and combinations thereof.

Preference is given to polymers of the invention having at least one OH-group and an OH number of between 1 and 250 mg KOH/g and an acid number of between 0.5 and 30 mg KOH/g. Preferably, the polymers have OH groups. More preferably, the polymers have an OH number of 5-200 mg KOH/g, very preferably of 10-100 mg KOH/g.

The invention further relates to processes for preparing the polymer of the invention.

The first process comprises the steps of
i) providing
a) a polymer backbone having at least one functional group and
b) a molecule having a group which is reactive towards said at least one functional group, a polyether segment, and a polysiloxane segment, said polysiloxane segment having a number average molecular weight in the range of 1050 to 6000, and said polyether segment being positioned between said group which is reactive towards said at least one functional group and the polysiloxane segment (the polymeric side chain), and
ii) forming a covalent bond between the polymer backbone a) and the molecule b) by reacting the at least one functional group with the group which is reactive towards said at least one functional group.

In this process, polymer backbone having at least one functional group is formed first and the polymeric side chain or side chains are attached thereto in a polymer analogous reaction, e.g. by transesterification, addition reaction or condensation reaction.

In one embodiment, a (meth)acrylic polymer backbone is formed first by polymerization of at least a monomer containing both a (meth)acrylic group such as a (meth)acrylate group and a reactive functional group, and the polymeric side chain or side chains are then attached to the formed (meth)acrylic backbone in a polymer analogous reaction to form a covalent bond, e.g. by transesterification, addition reaction or condensation reaction, via reaction of said functional group with the polymeric side chain having a group which is reactive towards said at least one functional group.

The (meth)acrylic polymer backbone can be prepared by polymerizing olefincally unsaturated polymerizable monomers, including acrylic and methacrylic monomers by methods well-known in the art, preferably by free-radical polymerization methods.

For a more detailed description of such a process reference is made to international patent application WO 2017/036612, in particular pages 13 to 18 and pages 48 to 51 of that publication.

Generally, the polymer backbone having at least one reactive functional group and the polymeric side chain having a group which is reactive towards said at least one functional group are combined and reacted in such an amount that 0.1 to 100% of the functional groups present in the polymer backbone are converted. In some embodiments, it may be desirable to retain some functional groups in the polymer backbone, for example for later curing reactions during application of the polymer of the invention in a curable composition.

In a further embodiment, when the polymer backbone of the polymer of the invention is a (co)polymer of polymerizable ethylenically unsaturated monomers, the polymer can be prepared by a process comprising copolymerizing a) a macromonomer MM having one polymerizable ethylenically unsaturated group, a polyether segment, and a polysiloxane segment, said polysiloxane segment having a number average molecular weight in the range of 1050 to 6000, and said polyether segment being positioned between the polymerizable ethylenically unsaturated group and the polysiloxane segment, and b) at least one other further monomer having at least one polymerizable ethylenically unsaturated group.

The macromonomer MM is suitably prepared by i) providing a) a monomer having one polymerizable ethylenically unsaturated group and one further functional group which is different from the polymerizable ethylenically unsaturated group, and b) a molecule having a group which is reactive towards said at least one further functional group, a polyether segment, and a polysiloxane segment, said polysiloxane segment having a number average molecular weight in the range of 1050 to 6000, and said polyether segment being positioned between said group which is reactive towards said at least one further functional group and the polysiloxane segment, ii) forming a covalent bond between the monomer a) and the molecule b) by reacting the at least one further functional group with the group which is reactive towards said at least one further functional group.

In a further embodiment, the macromonomer MM is prepared by i) providing a) a monomer having one polymerizable ethylenically unsaturated group, a polyether segment, and one further ethylenically unsaturated functional group which is different from the polymerizable ethylenically unsaturated group, and wherein the polyether segment is located between the polymerizable ethylenically unsaturated group and the further ethylenically unsaturated functional group, b) a molecule having a polysiloxane segment having a number average molecular weight in the range of 1050 to 6000 and one Si—H group, and ii) forming a covalent bond between the monomer a) and the molecule b) by a hydrosylilation reaction of the Si—H group on the further ethylenically unsaturated functional group.

For a more detailed description of such a process using macromonomers reference is made to international patent application WO 2017/036612, in particular pages 13 to 48 of that publication.

The polymer of the invention is very suitable to control surface properties in compositions, such as coating compositions, molding composition, pre-polymer compositions, cosmetic formulations, and the like. Therefore, the invention also relates to the use of the polymer according to the invention as an additive in a composition to control one or more properties of the composition selected from levelling, surface-slip, cratering, telegraphing, overcoatability, cissing, open time, dirt adhesion, self-cleaning, air draft sensitivity, telegraphing, fogging, and electrostatic properties.

Cissing is a coating defect, which can be defined as the gathering of a wet film into drops or streaks leaving parts of the surface to be coated bare or imperfectly covered. The surface to be coated may be the surface of a substrate or the surface of a previously applied coating layer. Cissing can occur in organic solvent based coatings as well as water based coatings.

A further subject-matter of the invention is a composition comprising a) the polymer according to the invention in an amount of 0.1 to 15% by weight, based on the total non-volatile content of the composition, and b) a binder, which is different from said polymer a).

Said composition preferably contains said polymer of the invention in an amount of from 0.1 to 10 wt.-%, preferably of from 0.2 to 8 wt.-%, more preferably of from 0.3 to 7 wt.-% or of from 0.3 to 6 wt.-% or of from 0.3 to 5 wt.-%, in particular of from 0.5 to 5.0 wt.-%, based in each case on the total weight of the non-volatile content of the composition. The polymers of the invention can be included in the composition as 100% substances, as a solution, as dispersion or as an emulsion.

The properties of the compositions, in particular of coating compositions, moulding compounds and cosmetic formulations are not impaired by the amount of the inventive polymer present therein. The presence or use of these polymers does not have a negative effect e.g. in respect of corrosion protection, gloss preservation, weather resistance and/or mechanical strength of the coatings obtained from these compositions.

In a typical embodiment, the composition is liquid at ambient temperature, for example at a temperature of 20° C. In some embodiments, the polymer according to the invention and or the binder present in the composition are liquid. In such cases, the composition may be liquid at ambient temperature without the need of a liquid volatile diluent. In other embodiments, it may be required or desirable to render the composition liquid or to achieve a desired viscosity by including a volatile diluent. The volatile diluent may be water or an organic solvent, or mixtures thereof. Hence, the composition may be an aqueous composition or a non-aqueous composition.

The inventive compositions comprise at least one binder. All customary binders known to the skilled person are suitable as binder component of the composition of the invention. The binder used in accordance with the invention preferably has crosslinkable functional groups. Any customary crosslinkable functional group known to the skilled person is contemplated here. More particularly the crosslinkable functional groups are selected from the group consisting of hydroxyl groups, amino groups, carboxylic acid groups, and unsaturated carbon double bonds, isocyanates, polyisocyanates, and epoxides such as ethylene oxides. The binder may be exothermically or endothermically crosslinkable or curable. The binder is crosslinkable or curable preferably in a temperature range from −20° C. up to 250° C. The binder is preferably selected from the group consisting of epoxide resins, polyesters, wherein the polyesters may be unsaturated, vinyl ester-based resins, poly (meth)acrylates, polyurethanes, polyureas, polyamides, polystyrenes, polyethers, polycarbonates, polyisocyanates, and melamine formaldehyde resins. These polymers may be homopoylmers or copolymers. These resins and their preparation are known to the skilled person.

The composition of the invention can be provided as a one-component system or as a two-component system.

The composition of the invention preferably comprises the binder in an amount of 3 to 90 wt.-%, preferably in an amount of 5 to 80 wt.-%, more preferably in an amount of 10 to 75 wt.-%, based on the total weight of the composition.

Depending on the desired application, the composition of the invention may comprise one or more customarily employed additives as component. These additives are preferably selected from the group consisting of emulsifiers, flow control assistants, solubilizers, defoaming agents, stabilizing agents, preferably heat stabilizers, process stabilizers, and UV and/or light stabilizers, catalysts, waxes, flexibilizers, flame retardants, reactive diluents, adhesion promoters, organic and/or inorganic nanoparticles having a particle size <100 nm, process aids, plasticizers, fillers, glass fibers, reinforcing agents, additional wetting agents and dispersants, light stabilizers, ageing inhibitors and mixtures of the aforesaid additives. Said additive content of the composition of the invention may vary very widely depending on intended use. The content, based on the total weight of the composition of the invention, is preferably 0.1 to 10.0 wt.-%, more preferably 0.1 to 8.0 wt.-%, very preferably 0.1 to 6.0 wt.-%, especially preferably 0.1 to 4.0 wt.-%, and particularly 0.1 to 2.0 wt.-%. The inventive compositions may be used in pigmented or unpigmented form and may also comprise fillers such as calcium carbonate, aluminium hydroxide, reinforcing fibres such as glass fibres, carbon fibres and aramid fibres.

The coating compositions of the invention are preferably coating compositions for producing anti-static coatings, antifogging coatings, self-cleaning facade coatings, car coatings, dirt-instrument coatings, marine coatings (anti-fouling coatings), and primer coatings. Owing to the outstanding compatibility of the copolymers, they are also outstandingly suitable for producing transparent coatings.

The compositions of the invention may be applied to a large number of substrates, such as wood, paper, glass, ceramic, plaster, concrete and metal, for example. In a multi-coat process the coatings may also be applied to primers, primer-surfacers or basecoats. Curing of the compositions depends on the particular type of crosslinking and may take place within a wide temperature range from, for example, —10° C. to 250° C. In a preferred embodiment, the substrate is a motor vehicle or a part thereof. Examples of motor vehicles are passenger cars, buses, trucks, trains, aircrafts, as well as motor driven agricultural and construction equipment.

The preferably polymeric moulding compounds of the invention preferably comprise at least one polymer selected from the group consisting of lacquer resins, alkyd resins, polyester resins, epoxy resins, polyurethane resins, unsaturated polyester resins, vinyl ester resins, polyethylene, polypropylene, polyamides, polyethylene terephthlate, PVC, polystyrene, polyacrylonitrile, polybutadiene, polyvinyl chloride or mixtures of these polymers or any copolymers thereof.

When the composition comprising the polymer of the invention is a coating composition, the coating composition are very suitable for preparing multilayer coating systems on a substrate. The multilayer coating systems comprise at least one undercoat layer and at least one topcoat layer, wherein at least one layer is based on a composition of the invention. In a preferred embodiment, the undercoat layer and the topcoat layer are based on a composition of the invention. Preferably, the undercoat layer and the topcoat layer have a common layer boundary. The undercoat layer and the topcoat layer may be prepared from different coating compositions, for example from a pigmented base coat composition for the undercoat layer and a non-pigmented clearcoat composition for the topcoat layer. Alternatively, the undercoat layer and the topcoat layer may be prepared from the same coating composition.

Hence, a further subject of the invention is a process of forming a multilayer coating system on a substrate comprising the steps of
i) applying a coating composition a) to a substrate to form a coating layer a) and
ii) applying a coating composition b) to form a coating layer ID) on top of coating layer a), wherein at least one of coating composition a) or coating composition b) comprises the polymer of the invention in an amount of 0.1 to 15% by weight, based on the total non-volatile content of the coating composition.

EXAMPLES

Raw materials:

| | |
|---|---|
| THF | Tetrahydrofuran (Aldrich) |
| Shellsol A | Mixture of aromatics, boiling range 148.9-182.2° C. (manufacturer: Royal Dutch Shell) |
| Bisomer MPEG550MA | methoxy polyethylene glycol 550 methacrylate (manufacturer: Cognis/BASF) |
| AAE450MA | α-allyl-ω-methacryloxy functional polyether, iodine number 87.3 g $I_2$/g (manufacturer: GEO Specialty Chemicals UK Ltd) |
| EHA | 2-ethylhexyl acrylate (manufacturer: Evonik) |
| Trigonox 21 | tert-butyl peroxy-2-ethylhexanoate (manufacturer: Akzo Nobel) |
| Setamine US 138 BB-70 | Partly butylated melamine in n-butanol (manufacturer: Allnex) |
| Setalux 1760 VB-64 | thermoplastic styrene acrylic in solvent naphtha/butanol (manufacturer: Allnex) |
| Setalux 91760 SS-53 | acrylic based resin in Solvent naphtha/ n-Butanol/propylene glycol (manufacturer: Allnex) |
| Setamine US 138 BB-70 | amino resin (melamine, butylated) in n-butyl acetate (manufacturer: Allnex) |
| Tinuvin 292 | liquid hindered amine light stabilizer (manufacturer: BASF) |
| Tinuvin 1130 | liquid UV absorber of the hydroxyphenyl benzotriazole class (manufacturer: BASF) |

GPC-analysis of the prepared macromonomers and copolymers

The number-average and weight-average molecular weights and the molecular weight distribution were determined according to DIN 55672-1:2007-08 at 40° C. using a high-pressure liquid chromatography pump (WATERS 600 HPLC pump) and a refractive index detector (Waters 410).

A combination of 3 Styragel columns from WATERS with a size of 300 mm×7:8 mm ID/column, a particle size of 5 µm and pore sizes HR4, HR2 and HR1 was used as separating columns. The eluent used for the copolymers was tetrahydrofuran with 1% by volume of dibutylamine with an elution rate of 1 ml/min. The conventional calibration was carried out using polystyrene standards.

For the Polydimethylsiloxane (PDMS) macromers the eluent was toluene with an elution rate of 1 ml/min. The conventional calibration was carried out using polydimethylsiloxane standards. Molecular weights reported and referred to in this document always have the unit g/mol.

Iodine Number

The Si—H group-content of the Si—H-functional PDMS macromonomers SM1 to SM4 and the Si—H-conversion during the hydrosilylation reaction for the preparation of the PDMS-Polyether block-copolymers was determined according to DIN 53241-1 via volumetric measurement of $H_2$.

OH Number

The hydroxyl group-content of the OH-functional PDMS-Polyether block-copolymers and the OH-conversion during the trans-esterification reaction for the preparation of the PDMS-Polyether block-macromonomers was determined according to DIN ISO 4629.

Non-Volatile Content

The amount of non-volatile matter (solids content) is determined via DIN EN ISO 3251:2008-06 at 150° C. for 20 min.

General procedure for the preparation of SiH-functional polysiloxane segments A four-necked flask provided with stirrer, thermometer, dropping funnel and nitrogen inlet tube is heated to 150° C. under nitrogen flow using a heat gun to remove traces of water. After cooling of the apparatus to ambient temperature under nitrogen flow, the vessel is charged with a solution hexamethylcyclotrisiloxane (D3) in cyclohexane, which has been dried over molecular sieve A3 for 24 h. At a reaction temperature of 20° C., butyllithium solution (1.7M in hexane) was introduced over a period of 5 min. The reaction mixture was not allowed to exceed 30° C. by cooling with a water bath. After 30 min, THF was slowly added to start the polymerization reaction. The temperature was monitored and kept below 30° C. After 5 h, the reaction was quenched by the addition of dimethylchlorosilane and stirred for additional 30 min. Afterwards, the mixture was neutralized by the addition of a sodium bicarbonate solution in water (8.0 wt %) and vigorously stirred for 1 h. The organic layer was separated, distilled in vacuum (20 mbar at 100° C.) to remove all solvents, and filtered through a plug of Celite. The product (unsymmetrical, SiH-functional polydimethylsiloxane) is a clear, colorless liquid of low viscosity.

TABLE 1

Overview of SiH-functional polysiloxane segments PSS prepared

|  | PSS1 | PSS2 | PSS3 | PSS4 | PSS5 |
|---|---|---|---|---|---|
| Raw materials in g | | | | | |
| D3 | 887.4 | 1843.3 | 2888.5 | 4883.4 | 9883.6 |
| Cyclohexane | 712.3 | 1479.6 | 2318.8 | 3919.9 | 7933.5 |
| Butyllithium solution (1.7M in hexane) | 277.3 | 277.3 | 277.3 | 277.3 | 277.3 |
| THF | 712.3 | 1479.6 | 2318.8 | 3919.9 | 7933.5 |
| Dimethylchlorosilane | 109.6 | 109.6 | 109.6 | 109.6 | 109.6 |
| Sodium Biocarbonate solution 8 wt % in water | 161.8 | 161.8 | 161.8 | 161.8 | 161.8 |

TABLE 1-continued

Overview of SiH-functional polysiloxane segments PSS prepared

|  | PSS1 | PSS2 | PSS3 | PSS4 | PSS5 |
|---|---|---|---|---|---|
| Analytical data | | | | | |
| Iodine number | 25.3 | 12.7 | 8.5 | 5.1 | 2.5 |
| $M_n$ | 968 | 1870 | 2937 | 4954 | 10300 |
| $M_w/M_n$ | 1.1 | 1.2 | 1.2 | 1.1 | 1.1 |

General procedure for the preparation of macromonomers MM having a polyether segment, a polysiloxane segment, and a polymerizable ethylenically unsaturated group A four-necked flask equipped with stirrer, thermometer, dropping funnel and nitrogen inlet tube is charged with the α-allyl-ω-methacryloxy-functional polyether, which is used in an molar excess of 25% with respect to the SiH-functional polysiloxane, the SiH-functional polysiloxane segment PSS, and ethyl acetate. The components are mixed and heated to 40° C. At that temperature 0.6 g catalyst (2% wt Karstedt's catalyst in Xylene) are added. The temperature is then increased to 60° C.

The conversion of SiH was monitored via Iodine number. It usually took between 1.5 and 2.5 hours to reach complete consumption of all SiH functions. After that the reaction mixture was cooled to ambient temperature and filtered through a cellulose filter paper, 2,6-Di-tert-butyl-4-methylphenol and 4-Methoxyphenol (each 0.026 g) were added to stabilize the product.

The macromonomers were obtained as clear, yellow and slightly viscous liquids.

TABLE 2

Overview of macromonomers MM prepared

| Raw materials in g | MM1 | MM2 | MM3 | MM4 | MM5 |
|---|---|---|---|---|---|
| PSS1 | 150.0 | | | | |
| PSS2 | | 200.0 | | | |
| PSS3 | | | 200.1 | | |
| PSS4 | | | | 150.0 | |
| PSS5 | | | | | 130.0 |
| AAE450MA | 108.3 | 71.9 | 51.3 | 23.0 | 9.3 |
| $M_n$ | 1394 | 1959 | 3105 | 5234 | 10511 |
| $M_w/M_n$ | 1.3 | 1.3 | 1.3 | 1.3 | 1.3 |

Preparation of the inventive copolymers A1 to A6 and comparative copolymers B1 to B3

In a beaker, the monomer mixture as per Table 3, including the initial amount of radical initiator Trigonox 21, is prepared and diluted with 30% of the total amount of Isobutanol mentioned in Table 3. This monomer mixture is transferred into a dropping funnel. A four-necked flask provided with stirrer, thermometer and a nitrogen inlet tube is charged with the remaining amount of Isobutanol and heated to 110° C. The dropping funnel with the monomer mixture is mounted on the reaction vessel and nitrogen is passed through the reaction apparatus for 10 min. After the reaction temperature is reached the monomer mixture is slowly metered in over a period of 90 minutes. Thereafter, the reaction temperature is maintained at 110° C. for 60 minutes, before 0.1 g Trigonox 21 is added. The reaction temperature is maintained at 110° C. for another 60 minutes before the solvent used is removed by distillation under vacuum on a rotary evaporator (20 mbar, 120° C.),

TABLE 3

Raw material amounts (in g) and analytical data for the synthesis of inventive
double-comb-block copolymers A1 to A7 and comparative copolymers B1, B2, and B3

|  | B1 | A1 | A2 | A3 | A4 | A5 | A6 | B2 | B3 |
|---|---|---|---|---|---|---|---|---|---|
| Isobutanol | 64.6 | 65.6 | 64.6 | 65.8 | 64.6 | 66.1 | 64.6 | 66.3 | 64.6 |
| MM1 | 6.7 | | | | | | | | |
| MM2 | | 5.4 | 6.7 | | | | | | |
| MM3 | | | | 5.0 | 6.7 | | | | |
| MM4 | | | | | | 4.6 | 6.7 | | |
| MM5 | | | | | | | | 4.4 | 6.7 |
| EHA | 31.4 | 31.9 | 31.4 | 32.0 | 31.4 | 32.2 | 31.4 | 32.2 | 31.4 |
| MPEG550MA | 60.1 | 61.0 | 60.1 | 61.3 | 60.1 | 61.5 | 60.1 | 61.7 | 60.1 |
| Trigonox 21 | 1.7 | 1.7 | 1.7 | 1.7 | 1.7 | 1.7 | 1.7 | 1.7 | 1.7 |
| Non-volatile matter in % wt | 99.6 | 99.5 | 99.8 | 99.4 | 99.8 | 99.7 | 99.7 | 99.7 | 99.7 |
| $M_n$ | 5690 | 5835 | 5852 | 5842 | 5771 | 5653 | 5851 | 5847 | 5650 |
| $M_w/M_n$ | 2.3 | 2.4 | 2.4 | 2.3 | 2.4 | 2.3 | 2.4 | 2.4 | 2.3 |

Application test in a solvent-borne clear coat

Preparation of a solvent-borne clearcoat SC1

The preparation of the solvent-borne clear coat is separated into several steps for better clarity. The steps are:
a) Preparation of the liquid formulation
b) Application, curing and evaluation Preparation of the liquid formulation of a solvent-borne clear coat SC1

TABLE 4

Raw materials for the solvent-borne clear coat

| Raw materials | Amount in g |
|---|---|
| Setalux 1760 VB 64 | 33.4 |
| Setalux C 91760 SS 53 | 26.2 |
| Setamine US 138 BB 70 | 21.2 |
| BYK 306 | 0.05 |
| BYK 331 | 0.1 |
| Tinuvin 292 | 0.5 |
| Tinuvin 1130 | 0.75 |
| n-Butanol | 2.2 |
| Shellsol A | 3.5 |
| Xylene | 12.1 |
| Surface additives as per Table 5 | 0.1, 0.3 and 0.7% wt on total formulation |

All components as per Table 4 were separately loaded and subsequently stirred in a PE beaker using a Dispermat CV equipped with a dissolver disc 50 mm at 1000 rpm for 20 min. After storing the formulation overnight at room temperature, the inventive surface additives and comparative examples as per Table 5, were added. Three concentrations (0.1% wt, 0.3% wt and 0.7% wt on total formulation) of the surface additives were evaluated.

Application, curing and evaluation in a solvent-borne clear coat SC1

The modified clear coat formulations were adjusted to 27 sec DIN 4 cup application viscosity by Shellsol A/Xylene (1:1) and applied on panel (coil-coat primered metal panels+waterborne base coat) by hand application. Afterwards, the panels were dried for 10 min at ambient temperature and then cured for 20 min at 140'C in a stoving oven. Dry film thickness approx. 30-40 μm. The surface slip (CoF=coefficient of friction) was measured by Altek equipment. The surface energy and contact angle of water were determined on the coated and cured panels using a Krüss G2 instrument. A low contact angle of water improves the wetting of next layer. In addition, the absence of craters in this application is crucial.

TABLE 5

Contact angle of water and leveling performance
in a solvent-borne clear coat SC1

| Additive | Dosage in wt % on solid | CoF | crater | Surface energy in mN/m total | disperse | polar | Contact angle H₂O in ° |
|---|---|---|---|---|---|---|---|
| control | | 0.53 | 0 | 26.8 | 21.0 | 5.8 | 82 |
| B1 | 0.1 | 0.23 | 0 | 27.4 | 19.3 | 8.1 | 77 |
| | 0.3 | 0.14 | 0 | 29 0 | 18 5 | 10.3 | 72 |
| | 0.7 | 0.16 | 0 | 31.3 | 16.2 | 15.1 | 64 |
| A1 | 0.1 | 0.14 | 0 | 26.8 | 18.8 | 8.0 | 78 |
| | 0.3 | 0.08 | 0 | 28.4 | 17.0 | 12.4 | 71 |
| | 0.7 | 0.08 | 0 | 32.0 | 15.6 | 16.4 | 63 |
| A2 | 0.1 | 0.12 | 0 | 27.4 | 18.4 | 9.0 | 76 |
| | 0.3 | 0.06 | 1 | 29.3 | 16.4 | 12.9 | 69 |
| | 0.7 | 0.08 | 0 | 32.8 | 15.4 | 17.4 | 62 |
| A3 | 0.1 | 0.13 | 0 | 27.3 | 18.1 | 9.2 | 75 |
| | 0.3 | 0.06 | 0 | 27.7 | 17.2 | 10.4 | 73 |
| | 0.7 | 0.07 | 0 | 30.6 | 15.5 | 15.5 | 66 |
| A4 | 0.1 | 0.13 | 0 | 26.3 | 18.6 | 7.7 | 78 |
| | 0.3 | 0.06 | 0 | 28.8 | 16.5 | 12.2 | 70 |
| | 0.7 | 0.06 | 0 | 31.0 | 15.5 | 15.5 | 65 |

TABLE 5-continued

Contact angle of water and leveling performance
in a solvent-borne clear coat SC1

| Additive | Dosage in wt % on solid | CoF | crater | Surface energy in mN/m total | disperse | polar | Contact angle $H_2O$ in ° |
|---|---|---|---|---|---|---|---|
| A5 | 0.1 | 0.22 | 0 | 24.8 | 19.7 | 5.1 | 84 |
|  | 0.3 | 0.06 | 0 | 25.6 | 18.8 | 6.8 | 81 |
|  | 0.7 | 0.04 | 0 | 27.8 | 17.6 | 10.2 | 74 |
| A6 | 0.1 | 0.10 | 0 | 24.8 | 20.4 | 4.4 | 86 |
|  | 0.3 | 0.04 | 0 | 25.7 | 19.0 | 6.7 | 81 |
|  | 0.7 | 0.04 | 0 | 27.8 | 17.8 | 10.0 | 76 |
| B2 | 0.1 | 0.32 | 0 | 26.1 | 21.7 | 4.4 | 86 |
|  | 0.3 | 0.18 | 0 | 27.3 | 20.5 | 6.6 | 81 |
|  | 0.7 | 0.11 | 0 | 27.1 | 19.2 | 7.9 | 78 |
| B3 | 0.1 | 0.32 | 0 | 26.3 | 22.0 | 4.3 | 87 |
|  | 0.3 | 0.17 | 0 | 27.0 | 20.6 | 6.4 | 81 |
|  | 0.7 | 0.16 | 0 | 26.7 | 19.2 | 7.5 | 79 |

From Table 5 it can be inferred that the polymers of the invention effectively decrease the coefficient of friction when included in a coating composition in small amounts, in particular more effectively than the comparative polymers B1, B2, and B3. The coefficient of friction is lowered more effectively than with the comparative polymers. A low coefficient of friction means that the coatings exhibit improved surface slip. This is achieved without negative effect on cratering.

Furthermore, with the polymers of the invention the surface energy is on a sufficiently high level, and the contact angle of water is sufficiently low. Both properties indicate good overcoatabilty. However, when the Mn of the polysiloxane segment in the polymer is outside the range of the present invention, these properties deteriorate.

Application test in a water-borne medium oil alkyd emulsion

Preparation of the liquid formulation 50 g of a waterborne medium oil alkyd emulsion (free of additives) was placed in a PE beaker and slowly stirred using a Dispermat CV equipped with a dissolver disc 30 mm at room temperature.

The amount of additive listed in table 6 was added and stirring at 2000 rpm was continued for 2 minutes. After storing the formulations overnight at room temperature a 150 μm bar film applicator (commercially available at BYK-Gardner GmbH, Lausitzer Str, 8, 82538 Geretsried) was used to apply the first coating layer of the respective formulation on a byko-chart (also commercially available at BYK-Gardner GmbH). The remaining liquid coating formulation material was sealed and stored overnight at room temperature. The respective byko-charts with the first layers were dried horizontally overnight at room temperature.

On the next day a second layer of the same liquid coating formulation (as used for the first layer) was applied onto the first layer using a 150 μm bar film applicator. After complete horizontal drying of the two-layer System, the appearance of the respective system was evaluated visually.

Application test results (anti-cissing)

The results are listed in following table.

TABLE 6

| Additive | Dosage in weight-% | |
|---|---|---|
| None |  | strong cissing |
| B1 | 0.5 | cissing |
| A1 | 0.5 | no cissing |
| A2 | 0.5 | no cissing |
| A3 | 0.5 | no cissing |
| A4 | 0.5 | no cissing |
| A5 | 0.5 | no cissing |
| A6 | 0.5 | no cissing |
| B2 | 0.5 | cissing |
| B3 | 0.5 | cissing |

The inventive polymers improve the performance of the coating system by preventing cissing.

The invention claimed is:

1. A polymer having
   a) a polymer backbone and
   b) one or more polymeric side chains covalently linked to the polymer backbone, wherein the polymeric side chains comprise a polyether segment and a polysiloxane segment,
   said polysiloxane segment having a number average molecular weight in the range of 1050 to 6000, and said polyether segment having a number average molecular weight in the range of 450 to 5000 and being positioned between the polymer backbone and the polysiloxane segment,
   wherein the polymer has a weight average molecular weight ranging from 4,500 to 15,000.

2. The polymer according to claim 1, wherein the polysiloxane segment has a number average molecular weight in the range of 1100 to 6000.

3. The polymer according to claim 1, wherein the polymer backbone is a (co)polymer of polymerizable ethylenically unsaturated monomers.

4. The polymer according to claim 1, wherein the polyether segment comprises polymerized units of alkylene oxides comprising one or more of ethylene oxide, propylene oxide, and combinations thereof.

5. The polymer according to claim 1, wherein the polymer further comprises functional groups.

6. The polymer according to claim 5, wherein the functional groups comprise one or more of hydroxyl groups, carboxylic acid groups, amino groups, etherified amino groups, amide groups, epoxide groups, alkoxysilyl groups, and combinations thereof.

7. A process for preparing a polymer, the process comprising copolymerizing a) a macromonomer MM having one polymerizable ethylenically unsaturated group, a polyether segment, and a polysiloxane segment, said polysiloxane segment having a number average molecular weight in the range of 1050 to 6000, and said polyether segment having a number average molecular weight in the range of 450 to 5000 and being positioned between the polymerizable ethylenically unsaturated group and the polysiloxane segment, and b) at least one other further monomer having at least one polymerizable ethylenically unsaturated group, the resulting polymer comprising a backbone and one or more polymeric side chains covalently linked to the polymer backbone, wherein the polymeric side chains comprise a polyether segment and a polysiloxane segment, said polysiloxane segment having a number average molecular weight in the range of 1050 to 6000, said polyether segment being positioned between the polymer backbone and the polysiloxane segment, and the resulting polymer having a weight average molecular weight ranging from 4,500 to 15,000.

8. The process according to claim 7, wherein the macromonomer MM is prepared by i) providing a) a monomer having one polymerizable ethylenically unsaturated group and one further functional group which is different from the polymerizable ethylenically unsaturated group, and b) a molecule having a group which is reactive towards said at least one further functional group, a polyether segment, and a polysiloxane segment, said polysiloxane segment having a number average molecular weight in the range of 1050 to 6000, and said polyether segment being positioned between said group which is reactive towards said at least of further functional group and the polysiloxane segment, ii) forming a covalent bond between the monomer a) and the molecule b) by reacting the at least one further functional group with the group which is reactive towards said at least one further functional group.

9. The process according to claim 7, wherein the macromonomer MM is prepared by i) providing a) a monomer having one polymerizable ethylenically unsaturated group, a polyether segment, and one further ethylenically unsaturated functional group which is different from the polymerizable ethylenically unsaturated group, and wherein the polyether segment is located between the polymerizable ethylenically unsaturated group and the further ethylenically unsaturated functional group, b) a molecule having a polysiloxane segment having a number average molecular weight in the range of 1050 to 6000 and one Si—H group, and ii) forming a covalent bond between the monomer a) and the molecule b) by a hydrosylilation reaction of the Si—H group on the further ethylenically unsaturated functional group.

10. A process for preparing a polymer, comprising the steps of:

i) providing a) a polymer backbone having at least one functional group and b) a molecule having a group which is reactive towards said at least one functional group, a polyether segment, and a polysiloxane segment, said polysiloxane segment having a number average molecular weight in the range of 1050 to 6000, and said polyether segment being positioned between said group which is reactive towards said at least one functional group and the polysiloxane segment, and ii) forming a covalent bond between the polymer backbone a) and the molecule b) by reacting the at least one functional group with the group which is reactive towards said at least one functional group, the resulting polymer comprising a backbone and one or more polymeric side chains covalently linked to the polymer backbone, wherein the polymeric side chains comprise a polyether segment and a polysiloxane segment, said polysiloxane segment having a number average molecular weight in the range of 1050 to 6000, and said polyether segment having a number average molecular weight in the range of 450 to 5000 and being positioned between the polymer backbone and the polysiloxane segment, and the resulting polymer having a weight average molecular weight ranging from 4,500 to 15,000.

11. The process of claim 10, the resulting polymer having a weight average molecular weight ranging from 3,500 to 75,000.

12. A composition comprising a) a polymer in an amout of 0.1 to 15% by weight, based on the total non-volatile content of the composition, the polymer having a polymer backbone and one or more polymeric side chains covalently linked to the polymer backbone, wherein the polymeric side chains comprise a polyether segment and a polysiloxane segment, said polysiloxane segment having a number average molecular weight in the range of 1050 to 6000, and said polyether segment being positioned between the polymer backbone and the polysiloxane segment, and b) a binder, which is different from said polymer a).

13. The composition according to claim 12, wherein the composition is liquid at a temperature of 20° C. and comprises a volatile diluent.

14. A multilayer coating system on a substrate comprising at least one undercoat layer and a one top-coat layer, wherein at least one layer is based on a composition according to claim 12.

15. The multilayer coating system according to claim 14, wherein the substrate is a motor vehicle or a part thereof.

16. The composition of claim 12, the polyether segment having a number average molecular weight in the range of 450 to 5000.

17. A process of forming a multilayer coating system on a substrate comprising the steps of i) applying a coating composition a) to a substrate to form a coating layer a) and ii) applying a coating composition b) to form a coating layer b) on top of coating layer a), wherein at least one of the coating composition a) or the coating composition b) comprises a polymer in an amount of 0.1 to 15% by weight, based on the total non-volatile content of the coating composition, the polymer having a polymer backbone and one or more polymeric side chains covalently linked to the polymer backbone, wherein the polymeric side chains comprise a polyether segment and a polysiloxane segment, said polysiloxane segment having a number average molecular weight in the range of 1050 to 6000, and said polyether segment being positioned between the polymer backbone and the polysiloxane segment.

18. The process of claim 17, the polyether segment having a number average molecular weight in the range of 450 to 5000.

* * * * *